United States Patent [19]
Lachaize

[11] Patent Number: 4,930,807
[45] Date of Patent: Jun. 5, 1990

[54] SEMI-ACTIVE HYDROPNEUMATIC SUSPENSION DEVICE AND AUTOMOTIVE VEHICLE EQUIPPED WITH THIS DEVICE

[75] Inventor: Henri Lachaize, Fontenay-Aux-Roses, France

[73] Assignees: Automobiles Peugeot, Paris; Automobiles Citroen, Neuilly Sur Seine, both of France

[21] Appl. No.: 292,435

[22] Filed: Dec. 30, 1988

[30] Foreign Application Priority Data

Jan. 12, 1988 [FR] France ................. 88 00276

[51] Int. Cl.[5] ............ B60G 21/00; B60G 11/04
[52] U.S. Cl. ................. 280/707; 280/708
[58] Field of Search ............ 280/707, 688, 708

[56] References Cited

U.S. PATENT DOCUMENTS

| | | | |
|---|---|---|---|
| 3,356,954 | 5/1967 | Gottschalk | 280/6 |
| 4,773,671 | 9/1988 | Inagaki | 280/707 |
| 4,796,911 | 1/1989 | Kuroki et al. | 280/707 |

FOREIGN PATENT DOCUMENTS

| | | |
|---|---|---|
| 0035330 | 9/1981 | European Pat. Off. |
| 1580316 | 3/1960 | Fed. Rep. of Germany . |
| 67446 | 3/1958 | France . |
| 68500 | 4/1958 | France . |
| 1256864 | 2/1961 | France . |
| 1535641 | 7/1968 | France . |
| 7006442 | 10/1971 | France . |
| 7337276 | 6/1974 | France . |
| 1488254 | 10/1977 | United Kingdom . |

OTHER PUBLICATIONS

"Automotive Products", Nov. 23, 1983.
French Patent Office Search Report, 10/88.
Design Engineering, "Fluid Power its Place in Car Design", pp. 59–65, (May, 1979).

Primary Examiner—Richard A. Bertsch
Attorney, Agent, or Firm—Kenyon & Kenyon

[57] ABSTRACT

The present invention relates to a semi-active hydropneumatic suspension device which comprises a hydraulic cylinder associated with each of the wheels, provided with a main chamber connected through the medium of a damper with a main hydropneumatic accumulator, each hydraulic cylinder of the front axle being equipped with a height corrector, whereas the rear axle is equipped with a height corrector controlling at least one of the hydraulic cylinders of this axle, wherein each of the hydraulic cylinders is provided with an annular chamber hydraulically connected with at least one hydropneumatic accumulator of the suspension, whereas the height corrector of the rear axle is fed by an additional hydropneumatic compensating accumulator.

20 Claims, 9 Drawing Sheets

SEMI-ACTIVE HYDROPNEUMATIC SUSPENSION DEVICE AND AUTOMOTIVE VEHICLE EQUIPPED WITH THIS DEVICE

BACKGROUND OF THE INVENTION

The present invention relates essentially to a semi-active hydropneumatic suspension device for an automotive vehicle.

It relates also to a vehicle of any type equipped with this device.

Semi-active hydropneumatic suspensions which react axle by axle substantially for slow load variations only have already been known.

A semi-active hydropneumatic suspension device has also been known for example from the publication Automotive Products dated 21.11.1983, which device comprises a hydraulic cylinder associated with each of the wheels and provided with a main chamber connected through the medium of a damper with a main hydropneumatic accumulator.

In this device, each of the hydraulic cylinders of the front axle is equipped with a height corrector which is fed by a source of fluid under pressure through the medium of a hydropneumatic compensating accumulator and which delivers fluid into an outflow tank for controlling the volume of fluid inside the main chamber of the hydraulic cylinder with which it is associated.

Besides, the rear axle of this suspension is equipped with a unique height corrector which is connected with the aforesaid hydropneumatic compensating accumulator and which controls simultaneously both hydraulic cylinders of this axle.

SUMMARY OF THE INVENTION

The invention has for an object to provide a suspension device, which on the one hand reacts in a conventional manner when the wheels of the vehicle are subjected to the normal irregularities of the road, and which on the other hand is adapted to compensate for the vertical spring movements or displacements of the elements of the suspension when these are durably release- or compression-stressed, so that the vehicle retains in a substantially constant manner its stability and its position with respect to the mean profile of the ground, in the case of a rolling motion while turning or of a pitching motion while accelerating or braking.

Thus, the invention imparts to the vehicle excellent road-holding qualities while avoiding angular positions which besides give rise to unpleasant feelings for the passengers.

To this end, the invention relates to a semi-active hydropneumatic suspension device for an automotive vehicle, of the type comprising a hydraulic cylinder associated with each of the wheels and provided with a main chamber connected through the medium of a damper with a main hydropneumatic accumulator, each hydraulic cylinder of an axle, for example of the front axle, being equipped with a height corrector connected on the one hand with a source of fluid under pressure through the medium of a hydropneumatic compensating accumulator and with an outflow tank, and on the other hand with the main chamber of the hydraulic cylinder, whereas the rear axle is equipped with a height corrector controlling at least one of the hydraulic cylinders of this axle, characterized in that each of the hydraulic cylinders is provided with an annular chamber which is hydraulically connected with at least one hydropneumatic accumulator of the suspension, whereas the said height corrector of the rear axle is fed by an additional hydropneumatic compensating accumulator.

According to another feature of the invention, the annular chamber of each of the hydraulic cylinders, of at least one axle, preferably the front axle, is connected in a hydraulic manner with the main hydropneumatic accumulator of the other hydraulic cylinder of this front axle.

It is to be precised here that the annular chamber of each of the hydraulic cylinders, of at least one axle, is connected with the main chamber of the other hydraulic cylinder of the same axle for communicating with its main hydropneumatic accumulator.

According to still another feature of this invention, the annular chamber of each of the hydraulic cylinders, of at least one axle, is connected directly with the hydropneumatic compensating accumulator of this axle.

It is still to be precised here that one of the hydraulic cylinders of the rear axle is equipped with a height corrector, connecting, depending on the height of the corresponding wheel, the main chamber of this hydraulic cylinder with the hydropneumatic compensating accumulator of the axle or with the outflow tank, whereas the other hydraulic cylinder of this same axle is provided with a slide valve distributor controlled by the four hydraulic cylinders of the suspension, controlling the volume of fluid inside the main chamber of the hydraulic cylinder with which the distributor is associated.

Besides, the slide valve of the aforesaid distributor is connected with the four main accumulators of the hydraulic cylinders of the suspension and is able to connect the main chamber of the hydraulic cylinder with which it is associated with the compensating accumulator of the rear axle or with the outflow tank, depending on the pressures inside the four main hydropneumatic accumulators.

Moreover, the slide valve of the distributor comprises at each end a stepped spindle defining on the one hand an annular chamber connected in an hydraulic manner with one of the main hydropneumatic accumulators of the hydraulic cylinders of the front axle, and on the other hand an extreme chamber connected with one of the main hydropneumatic accumulators of the hydraulic cylinders of the rear axle, which accumulator occupies a diagonally opposite position with respect to the accumulator of the aforesaid front axle.

BRIEF DESCRIPTION OF THE DRAWINGS

Other features and advantages of the invention will appear more clearly as the following explanatory description proceeds with reference to the accompanying drawings given by way of example only and wherein.

DETAIL DESCRIPTION

Figures 1, 2:
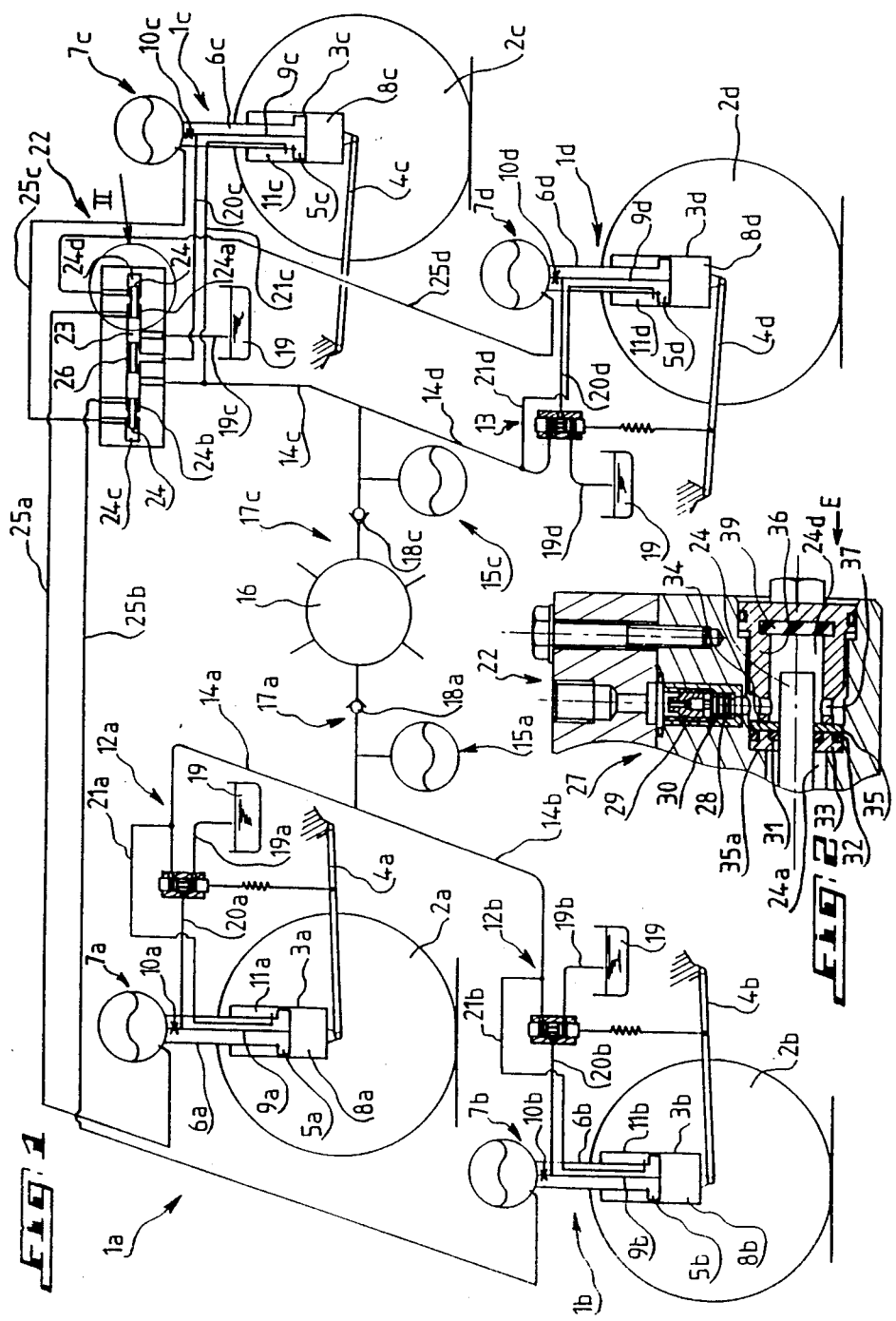
FIG. 1 is a very diagrammatic perspective view of a vehicle comprising a suspension device according to a first embodiment of this invention.
FIG. 2 is a partial view in the direction of arrow II of FIG. 1, of a portion of the slide valve distributor showing more particularly the arrangement of one of its ends.

Referring to the accompanying drawings, a semi-active hydropneumatic suspension device according to this invention comprises hydraulic cylinders 1a, 1b, 1c, 1d associated respectively with the front right wheel 2a, the front left wheel 2b, the rear right wheel 2c and the rear left wheel 2d.

Each of the hydraulic cylinders (1a . . . 1d) of at least one axle, is formed of a cylinder (3a . . . 3d) solid with an hinged wheel supporting arm (4a . . . 4d). A piston (5a . . . 5d) slides inside each of these cylinders (3a . . . 3d), which piston is disposed at the end of a rod (6a . . . 6d) which is mounted in a fixed manner on the body of a vehicle not shown.

A main hydropneumatic accumulator (7a . . . 7d) of a conventional type is disposed at the other end of rod (6a . . . 6d).

Each of the hydraulic cylinders (1a . . . 1d) is provided with a main chamber (8a . . . 8d) connected with the main hydropneumatic accumulator (7a . . . 7d) by means of a duct (9a . . . 9d) through a damper (10a . . . 10d).

Besides, it is to be noted that each of the hydraulic cylinders (1a . . . 1d) of the suspension is provided with an annular chamber (11a . . . 11d) defined by the cylinder (3a . . . 3d) and by the rod (6a . . . 6d).

Consequently, the main chamber (8a . . . 8d) of each of the hydraulic cylinders of at least one axle is disposed at the lower portion of cylinder (3a . . . 3d), whereas the annular chamber (11a . . . 11d) is disposed at the upper portion thereof.

Moreover, each hydraulic cylinder 1a, 1b of the front axle is equipped with a height corrector 12a, 12b controlled for example by the corresponding wheel supporting arm 4a, 4b whereas the rear axle is equipped with a height corrector 13 controlling at least one of the hydraulic cylinders 1c, 1d of this axle.

The height correctors 12, 12b of the front axle are connected respectively by a duct 14a, 14b with a hydropneumatic compensating accumulator 15a fed by a source 16 of fluid under pressure through the medium of a duct 17a equipped with a non-return valve 18a.

Besides, these height correctors can deliver fluid into a outflow tank 19 through the medium of respective ducts 19a, 19b. On the other hand, the height correctors 12a, 12b of a front axle are connected respectively by a duct 20a, 20b and by the duct 9a, 9b with the main chamber 8a, 8b of the hydraulic cylinders 1a, 1b. The height corrector 13 of the rear axle is connected by a duct 14d with an additional hydropneumatic compensating accumulator 15c, which is independent of the hydropneumatic compensating accumulator 15a of the front axle. This additional accumulator 15c is fed by the source 16 of fluid under pressure, through the medium of a duct 17c equipped with a non-return valve 18c. This precaution is not absolutely necessary, as the compensating accumulators 15a and 15c can be replaced by a unique accumulator.

On the other hand, the height corrector 13 is connected by a duct 20d with at least one of the main chambers 8c, 8d or with at least one of the annular chambers 11c, 11d of the hydraulic cylinders of the rear axle.

Referring now to FIG. 1, which shows a first embodiment of the hydropneumatic suspension device according to the invention, it is to be noted that the annular chambers 11a, 11b of the hydraulic cylinders 1a, 1b of the front axle, are connected respectively by a duct 21a, 21b with the hydropneumatic compensating accumulator 15a, whereas the annular chambers 11c, 11d of the hydraulic cylinders 1c, 1d of the rear axle are connected by a duct 21c, 21d with the hydropneumatic compensating accumulator 15c of this axle.

Consequently, the annular chamber (11a . . . 11d) of each of the hydraulic cylinders of at least one axle is connected directly with the hydropneumatic compensating accumulator 15a, 15c of this axle.

Besides, the suspension device according to this first embodiment, comprises a slide valve distributor 22 equipping for example the right-hand hydraulic cylinder 1c of the rear axle.

The sliding valve 23 of this distributor 22 comprises at each end a shouldered or stepped spindle 24 which defines on the one hand an annular chamber 24a, 24b and on the other hand an extreme chamber 24c, 24d.

The annular chambers 24a, 24b are connected respectively with the main hydropneumatic accumulators 7a, 7b of the hydraulic cylinders 1a, 1b of the front axle, by ducts 25a, 25b. The extreme chambers 24c and 24d are connected respectively with the main hydropneumatic accumulators 7c, 7d of the hydraulic cylinders 1c, 1d of the rear axle by ducts 25c, 25d.

Consequently, it is to be noted that the adjacent annular and extreme chambers defined by each shouldered or stepped spindle 24 are connected respectively with front 7a, 7b and rear 7d, 7c main hydropneumatic accumulators which are in diagonally opposite positions.

Besides, the slide valve distributor 22 is connected on the one hand by a duct 14c with the hydropneumatic compensating accumulator of the rear axle 15c, and on the other hand by a duct 19c with the outflow tank 19, whereas this distributor is connected by a duct 20c and by the duct 9c of rod 6c with the main chamber 8c of hydraulic cylinder 1c.

Thus, through the medium of its control annular chamber 26, the slide valve 23 due to its translation, is able to connect the main chamber 8c of hydraulic cylinder 1c with which it is associated with the hydropneumatic compensating accumulator 15c of the rear axle or with the tank 19, depending on the pressures inside the four main hydropneumatic accumulators (7a . . . 7d) of the suspension.

It is to be precised here that the arrival of the pressures into the slide valve distributor 22 through the ducts (25a ... 25d) can be restrained by a damping device 27 shown in FIG. 2 and formed of a stack of perforated washers 28 maintained by a threaded part 29 in a predetermined distance between distance members 30.

Besides, the tightness between the adjacent annular chambers 24a, 24b and extreme chambers 24d, 24c is performed at each end by means of two O-rings 31 and 32 maintained between two partitions 33 and 34.

The O-ring 31 is in contact with the periphery of spindle 24, while the O-ring 32 is in contact with the wall of the bore 35 formed in the recess E receiving this tightness system.

The partition 33 is maintained in abutment against the bottom 35a of bore 35, whereas partition 34 is maintained by the end of a threaded sealing element 36 which cooperates with the opening end of recess E.

This sealing element 36 is recessed and comprises at its free end two transversal openings 37 which permit the hydraulic connection between the damping device 27 and the extreme chamber 24d, 24c, whereas the neighbouring damping device (not shown) which is connected with ducts 25a, 25b, delivers fluid directly into the respective annular chambers 25a, 25b.

Besides, it is to be noted that the bottom of sealing element 36 is provided with a resilient member 39, made for example of elastomere, absorbing the impacts received by the end of spindle 24 when the latter is displaced abruptly.

Consequently, a semi-active hydropneumatic suspension has been obtained, which comprises independent height correctors 12a, 12b, 13 for at least three wheels of the vehicle and whose fluid volume inside the main chamber 8c of the fourth hydraulic cylinder 1c is controlled by the slide valve distributor 22, which is itself controlled by the pressures of the four hydraulic cylinders of the suspension.

Besides, a suspension has been obtained which permits controlling the distribution of the loads on the ground and which imparts to the vehicle excellent road-holding qualities. Thus, the respective sections of the hydraulic cylinders and of the slide valve of the distributor are determined so that the difference between the vertical forces on the ground of the two wheels of the rear axle be proportional to the difference between the vertical forces on the ground of the two wheels of the front axle.

Thus, a coefficient of proportionality k is determined, which, in this first embodiment, is equal to:

$$\frac{S \cdot a}{S'(A - a)}$$

In this relationship, S is the section of the main chamber 8a, 8b of the hydraulic cylinders of the front axle, S' is the section of the main chamber 8c, 8d of the hydraulic cylinders of the rear axle, A is the larger section of slide valve 23, and section of spindle 24.

Figure 3:
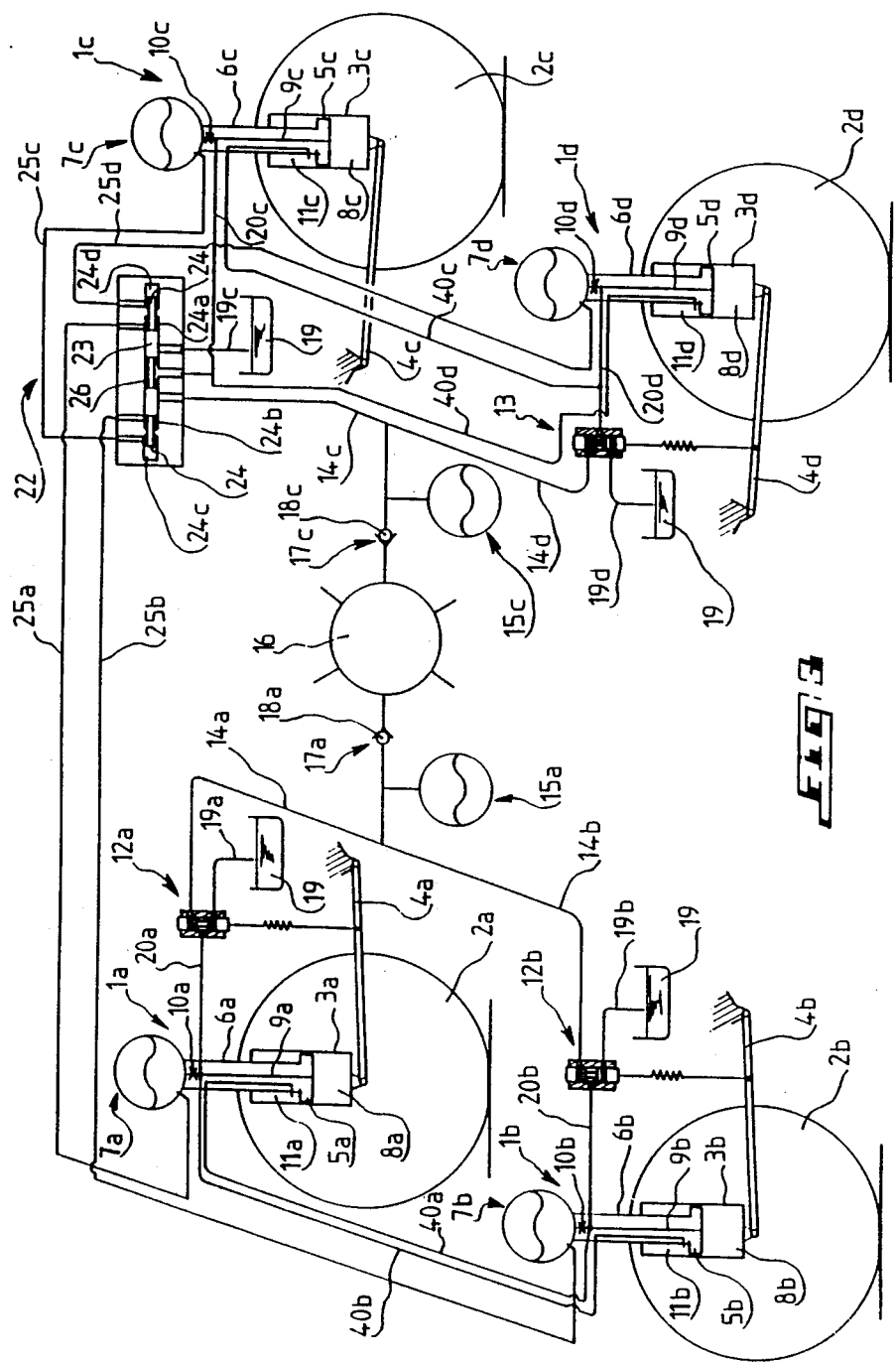
FIG. 3 shows an alternative embodiment of the device wherein annular chamber 11a is connected to chamber 8b.

Referring now to FIG. 3, a second embodiment of the device of the invention is shown wherein the annular chamber 11a of hydraulic cylinder 1a of the front axle is connected by a duct 40a with the main chamber 8b of hydraulic cylinder 1b, whereas the annular chamber 11b of hydraulic cylinder 1b is connected by a duct 40b with the main chamber 8a of hydraulic cylinder 1a.

Similarly, the annular chamber 11c of hydraulic cylinder 1c of the rear axle is connected by a duct 40c with the main chamber 8d of hydraulic cylinder 1d, whereas the annular chamber 11d of hydraulic cylinder 1d is connected by a duct 40d with the main chamber 8c of hydraulic cylinder 1c. Consequently, it is to be noted that the annular chamber 11a, 11b, 11c, 11d of each of the hydraulic cylinders of an axle is connected with the main chamber 8b, 8a, 8d, 8c of the other hydraulic cylinder of this same axle so as to communicate with its main hydropneumatic accumulator 7b, 7a, 7d, 7c.

Thus, the annular chamber 11a, 11b, 11c, 11d of each of the hydraulic cylinders of at least one axle is in hydraulic connection with the main hydropneumatic accumulator 7a, 7b, 7c, 7d of the other hydraulic cylinder of this same axle.

In this second embodiment, the respective sections of the hydraulic cylinders and of the slide valve of the distributor will be chosen so that the difference between the vertical forces on the ground of the two wheels of the rear axle be proportional to the difference between the vertical forces of the two wheels of the other axle, the coefficient of proportionality k being equal to:

$$\frac{(2S - s) \cdot a}{(2S' - s') \cdot (A - a)}$$

The parameters S, S', A and a are the same as those defined in the first embodiment, s being the section of rods 6a, 6b of the hydraulic cylinders of the front axle, s' being the section of rods 6c, 6d of the hydraulic cylinders of the rear axle.

Figure 4:
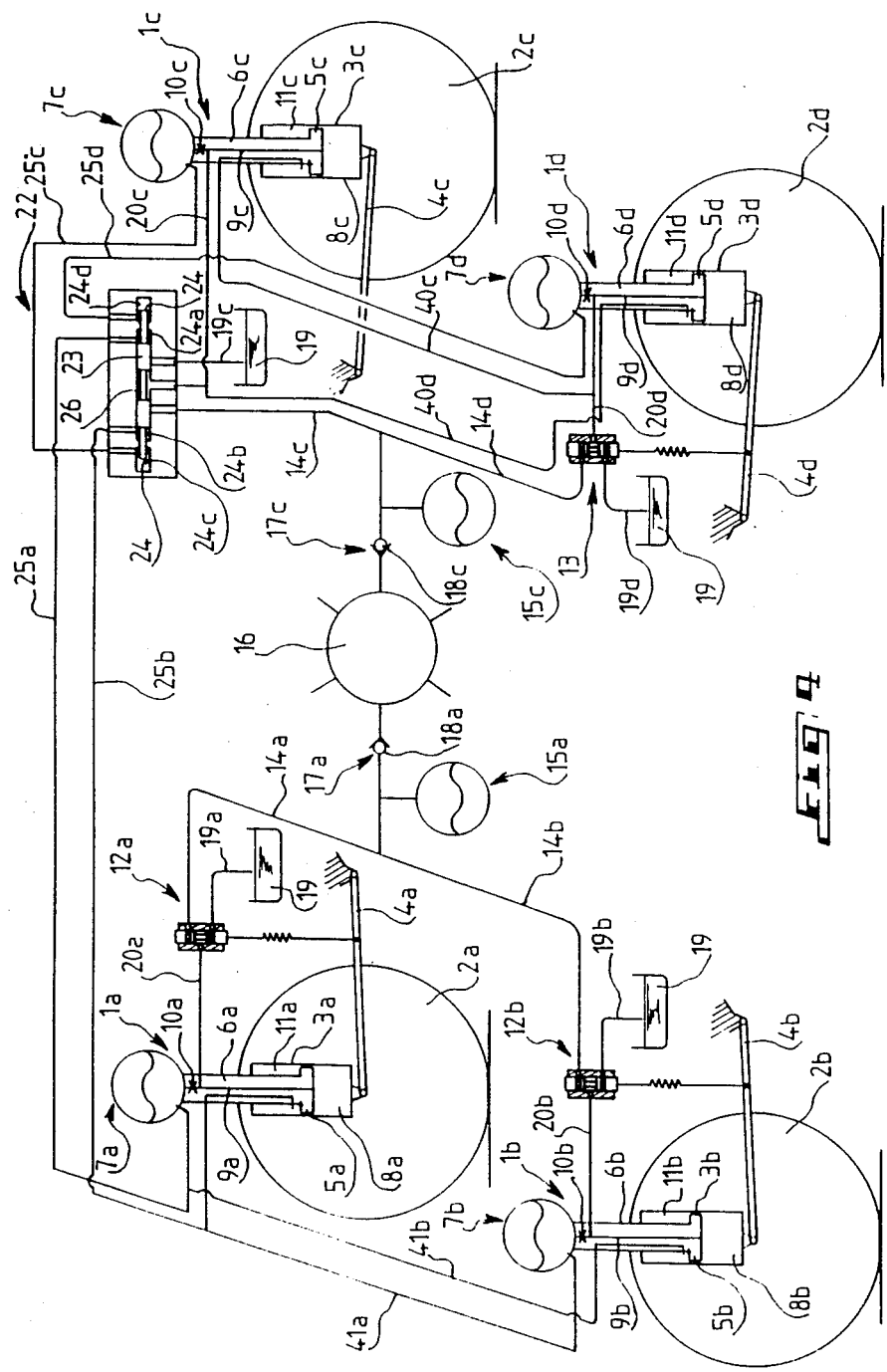
FIG. 4 shows a third embodiment in which for one of the axles, a different multiplicity of hydraulic connections is shown.

Referring now to FIG. 4, which shows a third embodiment of the suspension device according to the invention, it is seen that for one of the axles, for example the front axle, the annular chamber 11a, 11b of each of the hydraulic cylinders 1a, 1b is connected directly by a duct 41a, 41b with the main hydropneumatic accumulator 7b, 7a of the other hydraulic cylinder of this same axle.

Figure 5:
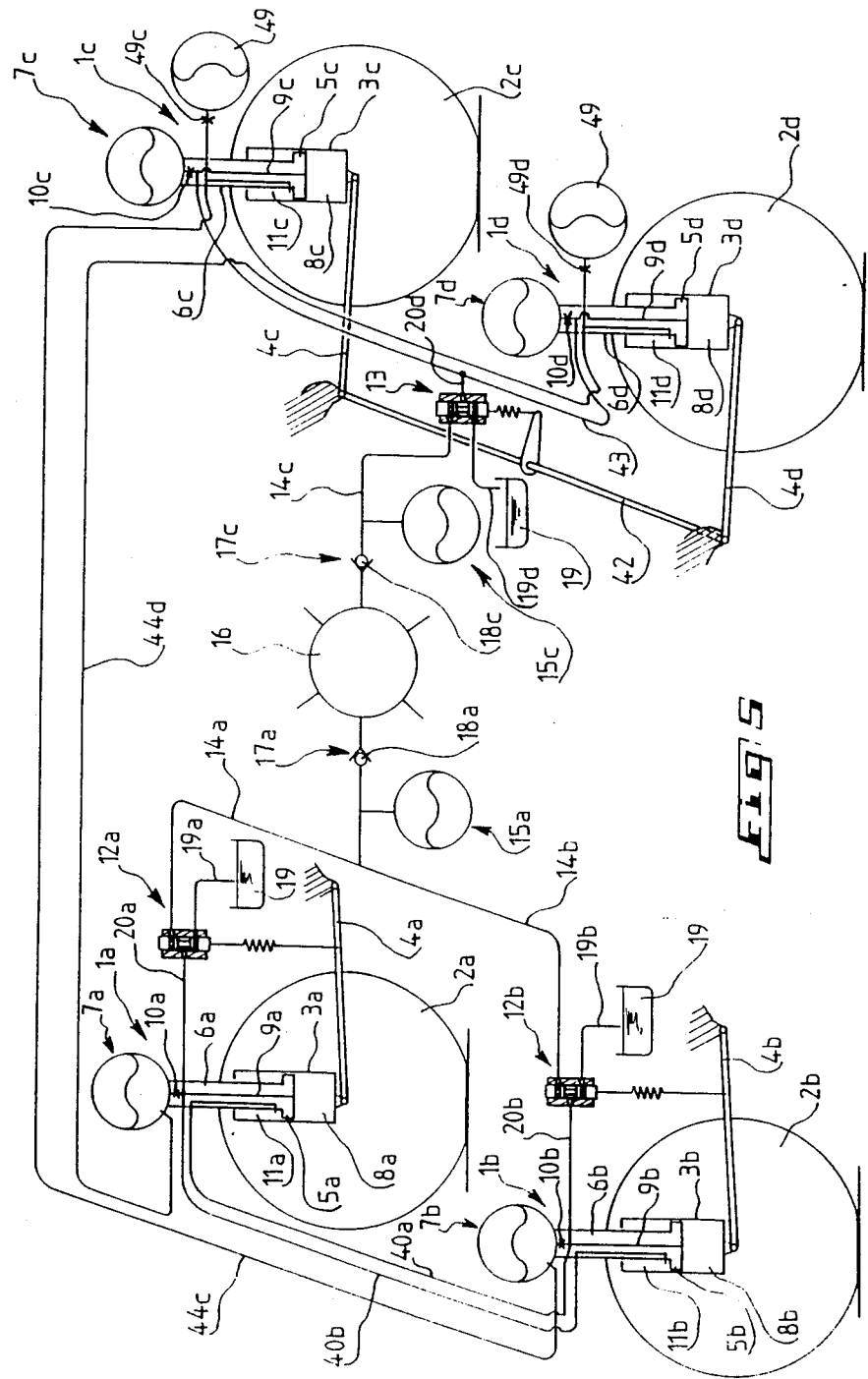
FIG. 5 shows a fourth embodiment in which the rear axle is actuated by control means 42.

FIG. 5 shows a fourth embodiment, wherein the height corrector 13 of the rear axle is actuated by one of the sections of a control means 42 of the antiroll bar-type, preferably by its median section.

Besides, in this embodiment, the height corrector 13 is connected with both hydraulic cylinders 1c, 1d of the rear axle.

More particularly, the height corrector is connected with the main chambers 8c, 8d of the respective hydraulic cylinders 1c, 1d by a duct 43 which is connected with the duct 20d.

Moreover, the annular chambers 11c, 11d are connected respectively with the main hydropneumatic accumulators 7b, 7a of hydraulic cylinders 1b, 1a of the front axle, which occupy diagonally opposite positions, by ducts 44c and 44d.

It is to be precised that the ducts 44c and 44d may be connected respectively with the main chambers 8b, 8a of hydraulic cylinders 1b, 1a by being connected directly with the ducts 9b, 9a, i.e. downstream of the dampers 10b, 10a.

Similarly, it is to be noted that the annular chamber 11a, 11b of each of the hydraulic cylinders of the front axle is hydraulically connected with the main chamber 8b, 8a of the opposite hydraulic cylinder of the same axle.

Figure 6:
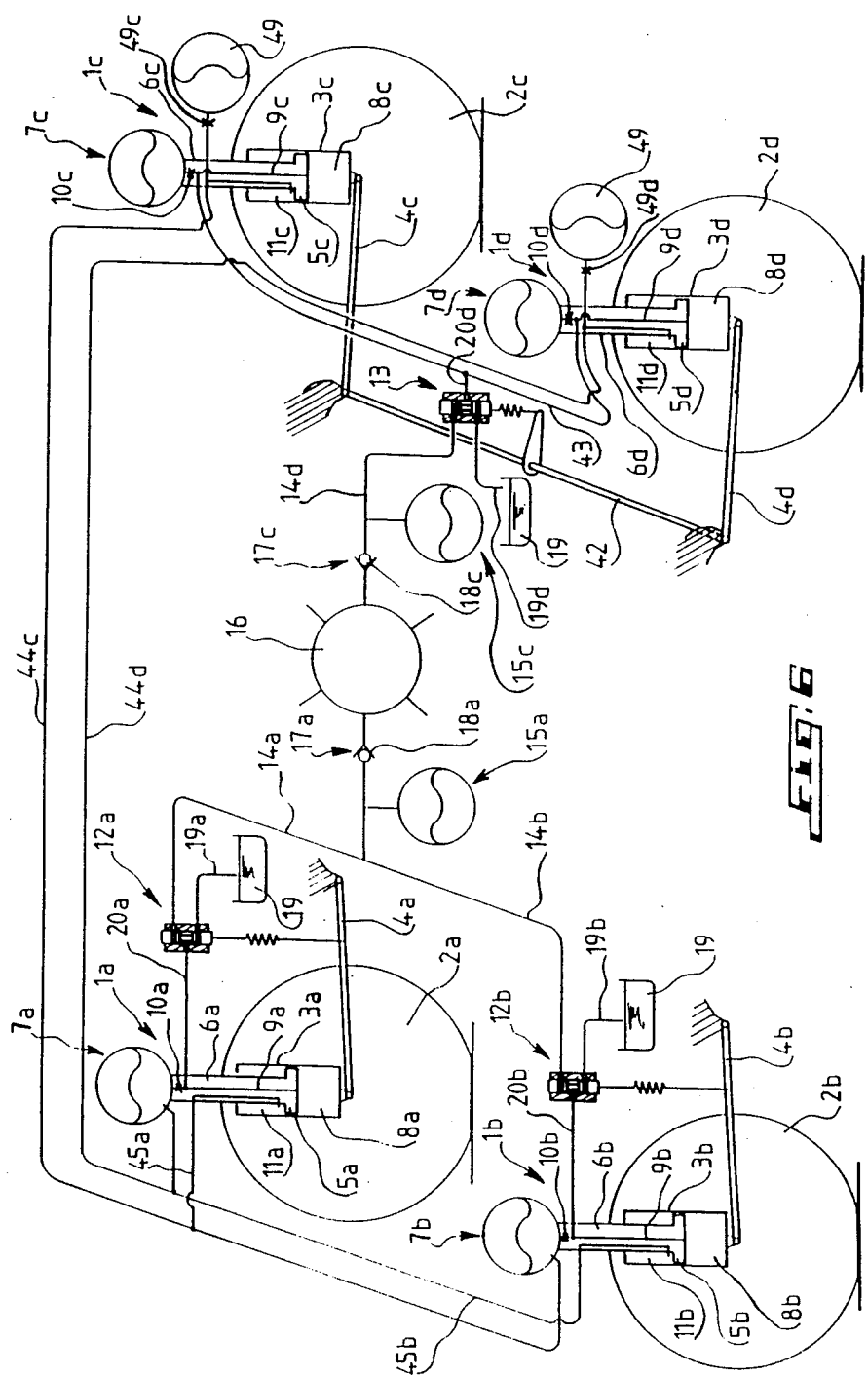
FIG. 6 shows a fifth embodiment in which there is a direct connection between annular chambers 11c, 11d with corresponding chambers 11a and 11b.

In the fifth embodiment of the device according to the invention, shown in FIG. 6, the ducts 44c and 44d have been connected respectively with ducts 45a and 45b opening into the respective annular chambers 11a and 11b of the hydraulic cylinders of the front axle. The annular chambers 11c, 11d therefore are connected directly with the respective annular chambers 11a, 11b.

Consequently, in these three options, the annular chamber 11c of hydraulic cylinder 1c is hydraulically connected with the accumulator 7d, the chamber 8b of the hydraulic cylinder 1b which is located in a diagonally opposite position and with the annular chamber 11a of hydraulic cylinder 1a, whereas the annular chamber 11d of hydraulic cylinder 1d is hydraulically connected with the main hydropneumatic accumulator 7a, with the main chamber 8a of the hydraulic cylinder 1a which is located in a diagonally opposite position and with the annular chamber 11b of hydraulic cylinder 1b. Thus, the annular chamber 11c, 11d of each of the hydraulic cylinders of the rear axle is hydraulically connected with the main hydropneumatic accumulator 7b, 7a of the hydraulic cylinder located in a diagonally opposite position of the front axle and with the annular chamber 11a, 11b of the other hydraulic cylinder of this same axle.

The sections of the hydraulic cylinders in these two embodiments will be determined so that the difference between the vertical forces of the two wheels of the rear axle be proportional to the difference between the vertical forces of the two other wheels, the coefficient of proportionality being equal to:

$$\frac{2S - s}{S' - s'}$$

Figure 7:
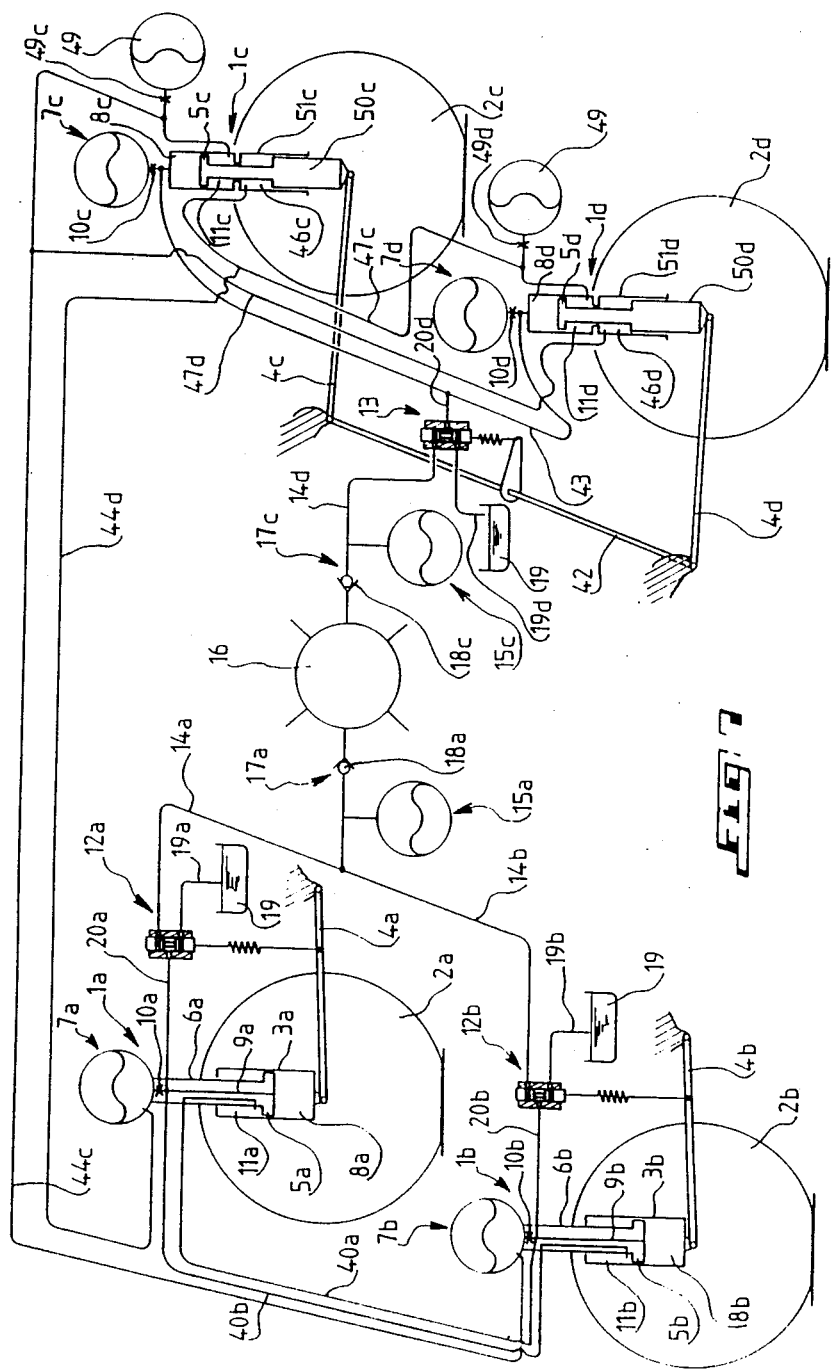
FIG. 7 shows a sixth embodiment in which the rear axle cylinders comprise second annular cylinders connected to first annular chambers of the opposite hydraulic cylinder by ducts.

FIG. 7 represents a sixth embodiment wherein each hydraulic cylinder 1c, 1d of the rear axle comprises a second annular chamber 46c, 46d connected with the first annular chamber 11d, 11c of the opposite hydraulic cylinder of the same axle by a duct 47c, 47d.

The ducts 47c, 47d are connected respectively with ducts 44d, 44c so that the second annular chambers 46c and 46d be respectively in hydraulic connection with the main hydropneumatic accumulators 7a, 7b of the hydraulic cylinders of the same side of the front axle, and consequently in hydraulic connection with the annular chambers 11b, 11a of the hydraulic cylinders occupying a diagonally opposite position through the medium of ducts 40b, 40a.

Figure 8:
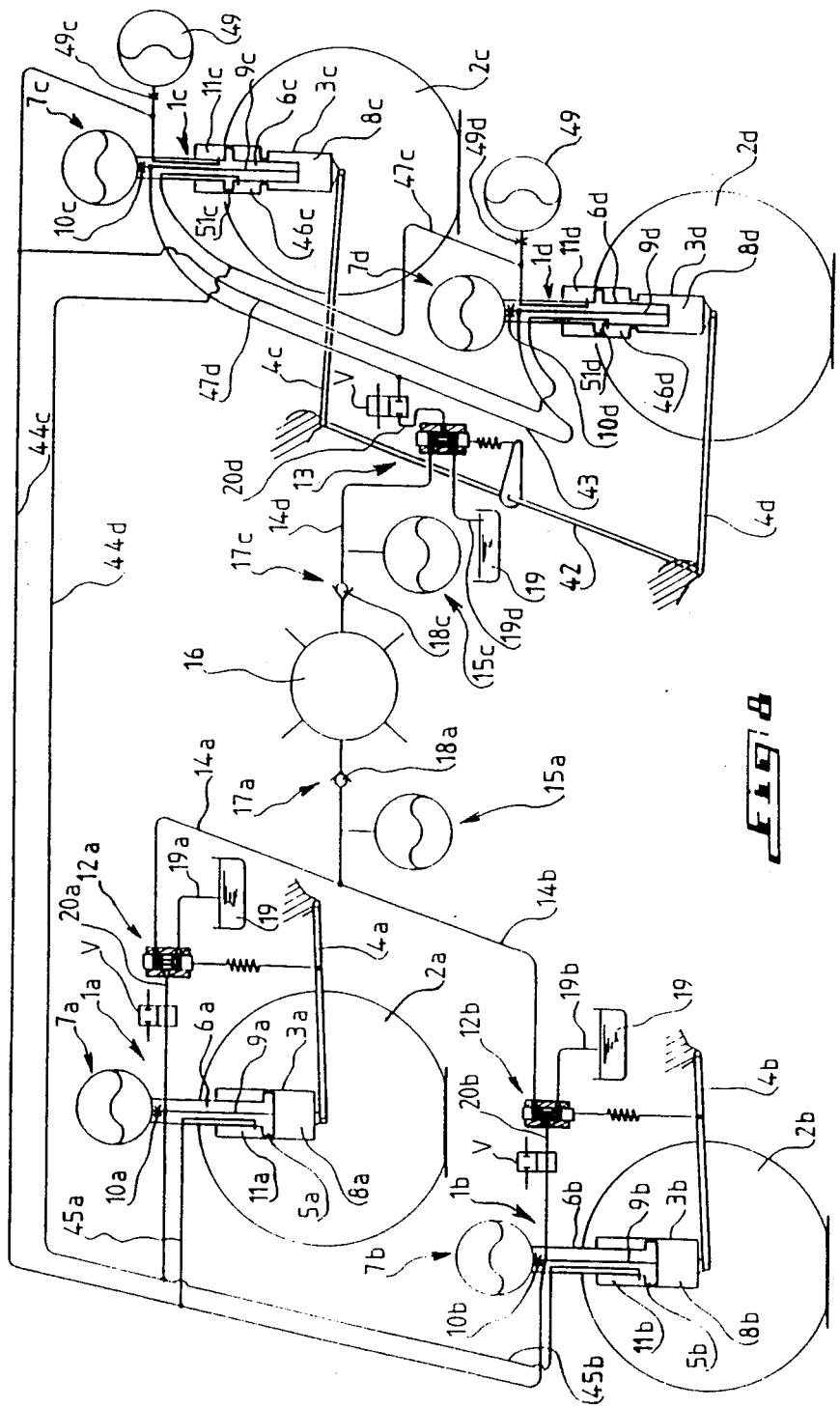
FIG. 8 shows an alternative embodiment in which annular chambers of the rear axle hydraulic cylinder are of larger useful section than the corresponding main chamber.

Referring now to FIG. 8 which shows a seventh embodiment of the suspension device according to the invention, it is seen that the annular chambers 11c, 46c and 11d, 46d of the respective hydraulic cylinders 1c, 1d of the rear axle have a larger useful section than the useful section of the corresponding main chamber 8c, 8d.

It is to be noted here that the second annular chamber 46c of hydraulic cylinder 1c is connected on the one hand with the first annular chamber 11d of the other hydraulic cylinder 1d of the same axle through the medium of the duct 47c, and on the other hand with the main chamber 8a of the opposite hydraulic cylinder 1a of the other axle by the duct 44d, and with the annular chamber 11d of the hydraulic cylinder 1b located in a diagonally opposite position by duct 45b.

Similarly, the second annular chamber 46d of hydraulic cylinder 1d is connected on the one hand with the first annular chamber 11c of the other hydraulic cylinder of the same axle by duct 47d, and on the other hand with the main chamber 8b of the opposite hydraulic cylinder 1b of the other axle by duct 44c, and with the annular chamber 11a of the hydraulic cylinder 1a occupying a diagonally opposite position by duct 45a.

It is to be noted that the ducts 44c and 44d are connected respectively with the ducts 9b and 9a of hydraulic cylinders 1b and 1a of the front axle, downstream of dampers 10b and 10a.

Moreover, the rods 6c and 6d of hydraulic cylinders 1c and 1d have been provided respectively with an annular piston 51c, 51d which, upon translation, defines the annular chambers 11c, 46c and 11d, 46d; the pressure inside main chamber 8c, 8d acting at the end of rod 6c, 6d.

Besides, the ducts 20a, 20b and 20d of the respective height correctors 12a, 12b and 13 have been provided with electro-valves V which permit connecting, respectively disconnecting the aforesaid height correctors with, respectively from the hydraulic cylinders with which they are associated.

These electro-valves permit cancelling the action of the height correctors outside the acceleration, braking and turning stresses or weakening the action of these height correctors.

Besides, this arrangement permits lowering the energy consumption and preventing the quality of the suspension from decreasing outside the aforesaid stresses, in case of running on a bad road with too rapid height correctors.

These electro-valves can be replaced by isolation slide valves, not shown, controlled by the pressure of the braking system and/or by the pressure of the hydraulic assisted steering device.

Besides, for both preceding embodiments, the respective sections of the hydraulic cylinders are determined so that the difference between the vertical forces of the wheels of the rear axle be proportional to the difference between the vertical forces of the two wheels of the other axle, the coefficient of proportionality being equal to:

$$\frac{2S - s}{2(S' - s')}$$

Figure 9:
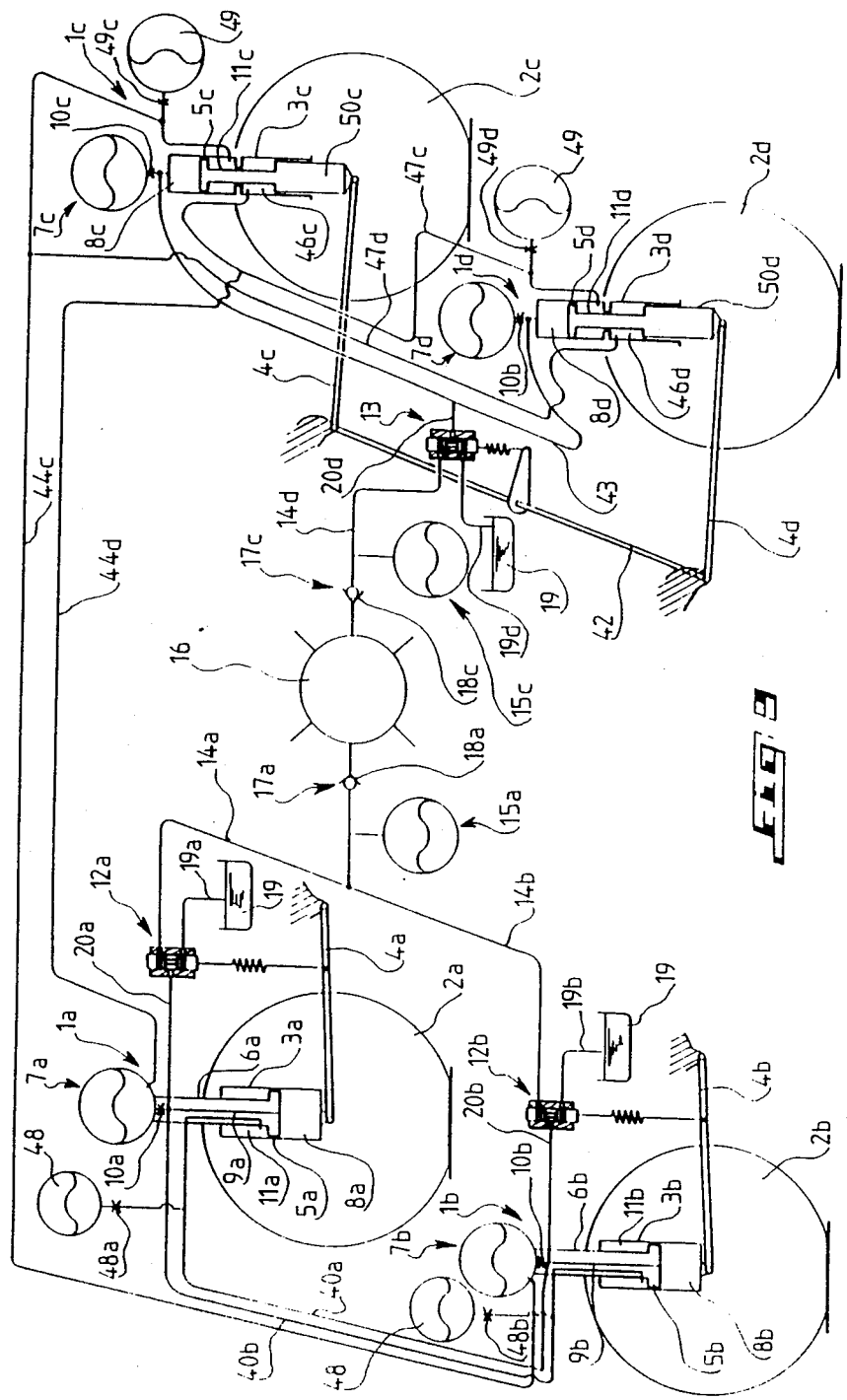
FIG. 9 shows an alternative embodiment comprising additional hydropneumatic accumulators equipped with dampers.

FIG. 9 shows a eighth embodiment of the device according to the invention, wherein the ducts 40a, 40b connecting the annular chambers 11a, 11b of each of the hydraulic cylinders 1a, 1b of the front axle with the respective main chambers 8b, 8a are provided with additional hydropneumatic accumulators 48 equipped with dampers 48a, 48b.

Thus, this arrangement permits limiting the effect of the pressure losses in the ducts and improving the quality of the suspension of the vehicle.

Similarly, it is to be noted that for most of the embodiments disclosed, the annular chambers of the hydraulic cylinders of the rear axle have been provided with additional hydropneumatic accumulators equipped respectively with a damper 49b, 49d which permit limiting the effect of the pressure losses, as do the aforesaid hydropneumatic accumulators 48.

Figure 10:
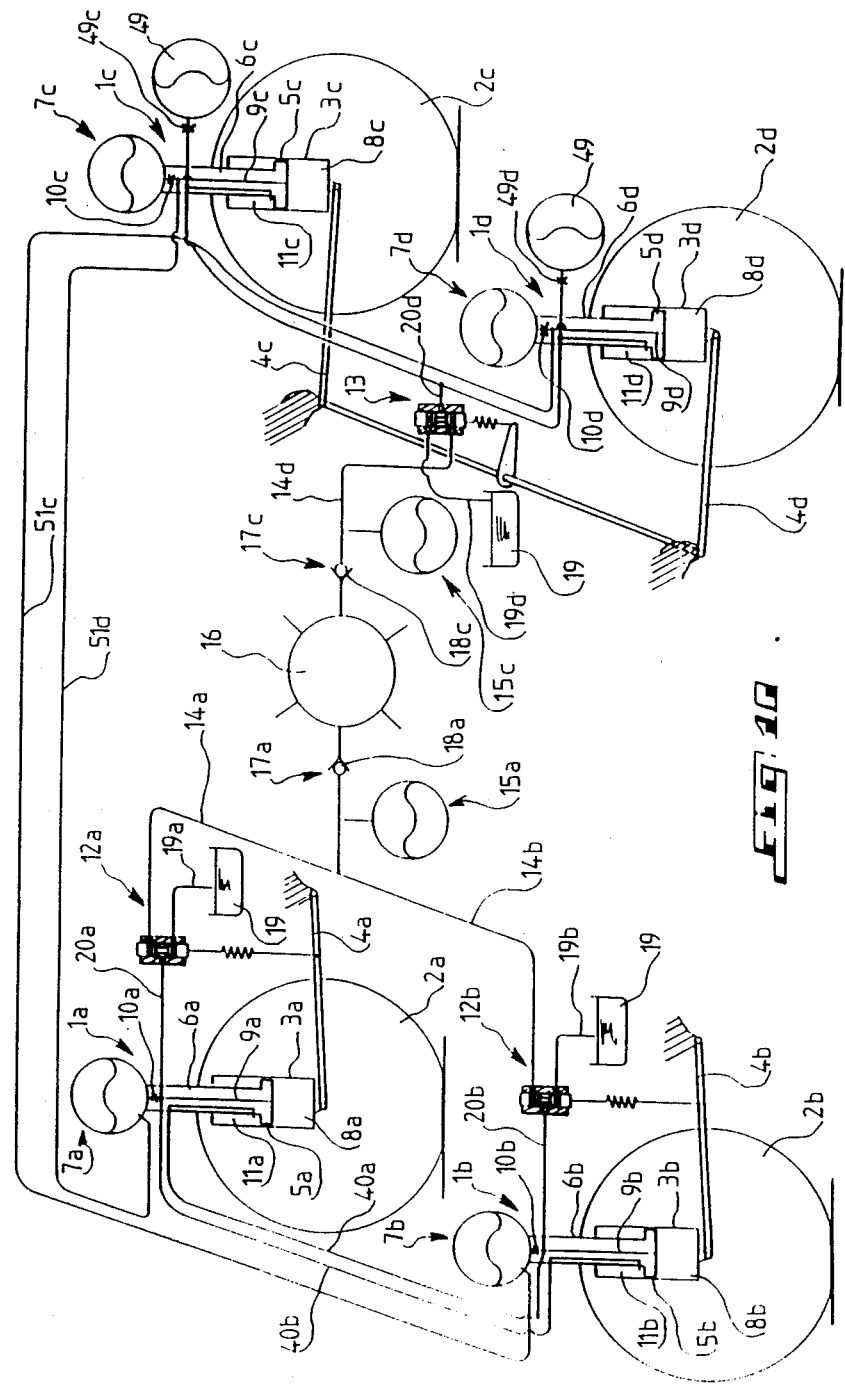
FIG. 10 shows an embodiment in which the source of fluid under pressure and with the outflow tank is reversed.

Referring now to FIG. 10 which shows a ninth embodiment of the device according to the invention, it is seen that the height corrector 13 of the rear axle is connected with the annular chambers 11c, 11d of the hydraulic cylinders of the rear axle whereas each of the main chambers 8c, 8d of these hydraulic cylinders is on the one hand connected with the main hydropneumatic accumulator 7a, 7b of the opposite hydraulic cylinder of the front axle by ducts 51c and 51d and is on the other hand in hydraulic connection with the annular chamber 11b, 11a by duct 40b, 40a.

To this end, the position of the ducts 14d and 19d connected respectively with the source of fluid under pressure and with the outflow tank has been reversed on the height corrector.

In this embodiment the respective sections of the hydraulic cylinders are determined so that, as in the preceding embodiments, the difference between the vertical forces of the wheels of one axle be proportional to the difference between the vertical forces of the wheels of the other axle, the coefficient of proportionality k being equal to:

$$\frac{2S - s}{S'}$$

It is to be noted that in all these embodiments, the height correctors of a known type such as that disclosed in the French Patent No. 1 210 581, are dimensioned so as to permit a large instantaneous flow rate while being adjusted in order to react only against relatively slow movements of rolling by turning or of pitching by accelerating or braking, and not when the vehicle meets normal irregularities of the road.

Moreover, it is to be precised that in all these embodiments, the hydraulic cylinders can be inversed, as shown as an example in FIG. 7.

Indeed, it is seen that the rods 50c and 50d of the hydraulic cylinders of the rear axle are mechanically connected with the wheel supporting arm, whereas the associated cylinders 51c and 51d are fastened on the non shown body of the vehicle.

Of course, the invention is by no means limited to the described and illustrated embodiments which have been given by way of example only.

On the contrary, the invention encompasses all the technical equivalents of the means disclosed as well as their combinations provided these are made according to the spirit thereof.

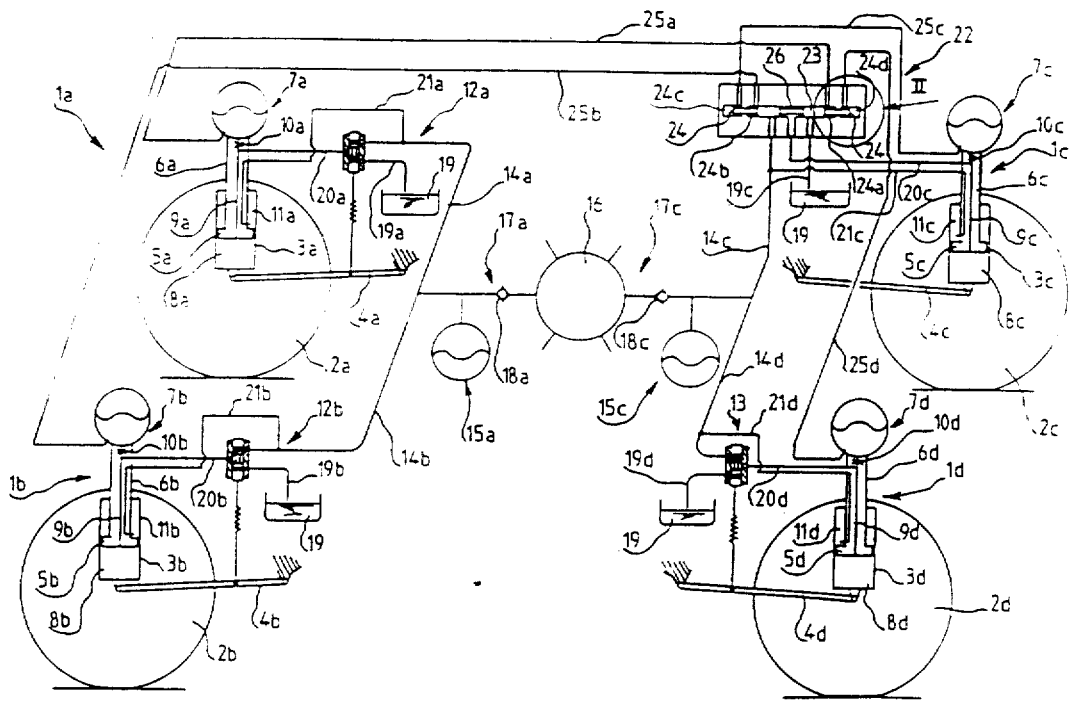

What is claimed is:

1. A semi-active hydropneumatic suspension device for an automotive vehicle of the type comprising a hydraulic cylinder associated with each of the wheels and provided with a main chamber connected through the medium of a damper with a main hydropneumatic accumulator, each hydraulic cylinder of the front axle, being equipped with a height corrector connected with a source of fluid under pressure through the medium of a hydropneumatic compensating accumulator and with an outflow tank, and also with the main chamber of the hydraulic cylinder, whereas the rear axle is equipped with a height corrector controlling at least one of the hydraulic cylinders of this axle, wherein each of the hydraulic cylinders is provided with an annular chamber which is hydraulically connected with at least one hydropneumatic accumulator of the suspension, whereas the said height corrector of the rear axle is fed by a hydropneumatic compensating accumulator.

2. A device according to claim 1, wherein the annular chamber of each of the hydraulic cylinders of the front axle, is connected with the main hydropneumatic accumulator of the other hydraulic cylinder of this axle.

3. A device according to claim 1, wherein the annular chamber of each of the hydraulic cylinders of at least one axle is connected with the main chamber of the other hydraulic cylinder of this same axle in order to communicate with its main hydropneumatic accumulator.

4. A device according to claim 1, wherein the annular chamber of each of the hydraulic cylinders of at least one axle is connected directly with the hydropneumatic compensating accumulator of this axle.

5. A device according to claim 1, wherein one of the hydraulic cylinders of the rear axle is equipped with a height corrector connecting, depending on the height of the corresponding wheel, the main chamber of this hydraulic cylinder with one of hydropneumatic compensating accumulator of the axle, and the outflow tank, whereas the other hydraulic cylinder of this same axle is provided with a slide valve distributor controlled by the four hydraulic cylinders of the suspension, controlling the volume of fluid inside the main chamber of the hydraulic cylinder with which the distributor is associated.

6. A device according to claim 5, wherein the slide valve of the aforesaid distributor is connected with the four main hydropneumatic accumulators of the hydraulic cylinders of the suspension and is able to connect the main chamber of the hydraulic cylinder with which it is associated with one of the compensating accumulator of the rear axle, and the outflow tank, depending on the pressures of the aforesaid four main hydropneumatic accumulators.

7. A device according to claim 5, wherein the slide valve of the distributor comprises at each end a shouldered or stepped spindle defining an annular chamber connected with one of the main hydropneumatic accumulators of the hydraulic cylinders of the front axle, and an extreme chamber connected with one of the main hydropneumatic accumulators of the hydraulic cylinders of the rear axle, which accumulator occupies a diagonally opposite position with respect to the accumulator of the front axle.

8. A device according to claim 5, wherein the annular chamber of each of the hydraulic cylinders of the rear axle is connected with one of the hydropneumatic compensating accumulator of this axle or with, and the main chamber of the other hydraulic cylinder of this same axle.

9. A device according to claim 8, wherein the respective sections of the hydraulic cylinders of the front axle and of the hydraulic cylinders of the rear axle, as well as the sections of the slide valve of the distributor are chosen so that the difference between the vertical forces on the ground of the two wheels of the rear axle be proportional to the difference between the vertical forces on the ground of the two wheels of the front axle, the coefficient of proportionality being either equal to:

$$\frac{S \cdot a}{S'(A - a)}$$

when the annular chambers of the hydraulic cylinders of the rear axle are connected with the hydropneumatic compensating accumulator of this axle, or to:

$$\frac{(2S - s) \cdot a}{(2S' - s')(A - a)}$$

when the aforesaid annular chambers are connected with the main chamber of the other hydraulic cylinder of this same axle, with S, in the above equations, being the section of the main chamber of the hydraulic cylinders of the front axle, S' being the section of the main chamber of the hydraulic cylinders of the rear axle, A is the larger section of said slide valve, a is the section of said spindle, and s and s' are the sections of rods of the hydraulic cylinders of the front and rear axles respectively.

10. A device according to claim 1, wherein the rear axle is provided with a control means of the antiroll bar-type, which actuates according to the orientation of its median section, the height corrector of the rear axle which is associated with the hydraulic cylinders of this axle, wherein the annular chamber of each of the hydraulic cylinders of the rear axle is connected with one of the main hydropneumatic accumulator, and directly with the main chamber of the hydraulic cylinder of the front axle which is diagonally opposite to it, said main chamber being directly connected with the annular chamber of the other hydraulic cylinder of the aforesaid front axle.

11. A device according to claim 10, wherein the dimensions of the hydraulic cylinders of the front and rear axles are chosen so that the difference between the vertical forces on the ground of the two wheels of the rear axle be proportional to the difference between the vertical forces on the ground of the two wheels of the front axle, the coefficient of proportionality being equal to:

$$\frac{2S - s}{S' - s'}.$$

with S, in the above equation, being the section of the main chamber of the hydraulic cylinders of the front axle, S' being the section of main chamber of the hydraulic cylinders of the rear axle, and s and s' are the sections of rods of the hydraulic cylinders of the front and rear axles respectively.

12. A device according to claim 10, wherein each hydraulic cylinder of the rear axle is provided with a second annular chamber connected with the first annular chamber of the other hydraulic cylinder of this same axle.

13. A device according to claim 12, wherein the annular chambers of the hydraulic cylinders of the rear axle have a larger useful section than the useful section of the corresponding main chamber.

14. A device according to claim 12, wherein the dimensions of the hydraulic cylinders of the front and rear axles are chosen so that the difference between the vertical forces on the ground of the two wheels of the rear axle be proportional to the difference between the vertical forces on the ground of the two wheels of the front axle, the coefficient of proportionality k being equal to:

$$\frac{2S - s}{2(S' - s')}$$

with S, in the above equation, being the section of the main chamber of the hydraulic cylinders of the front axle, S' being the section of main chamber of the hydraulic cylinders of the rear axle, and s and s' are the sections of rods of the hydraulic cylinders of the front and rear axles respectively.

15. A device according to claim 1, wherein the rear axle is provided with a control means, of the antiroll bar-type, which actuates according to the orientation of one of its median section, the height corrector of the rear axle which is associated with the hydraulic cylinders of this axle, wherein the aforesaid height corrector is connected with the annular chambers of the hydraulic cylinders, whereas each of the main chambers of these hydraulic cylinders is connected with the main hydropneumatic accumulator of the opposite hydraulic cylinder of the front axle.

16. A device according to claim 15, wherein the dimensions of the hydraulic cylinders of the front and rear axles are such that the difference between the vertical forces on the ground of the two wheels of the rear axle be proportional to the difference between the vertical forces on the ground of the two wheels of the front axle, the coefficient of proportionality k being equal to:

$$\frac{2S - s}{S'}.$$

where S is the section of the main chamber of the hydraulic cylinders of the front axle, S' is the section of main chamber of the hydraulic cylinders of the rear axle, and s is the section of rod of the hydraulic cylinder of the front axle.

17. A device according to claim 1, wherein each of the annular chambers of the front axle and of the rear axle is connected with an additional hydropneumatic accumulator.

18. A device according to claim 1, wherein the height correctors of the suspension are provided with electro-valves which permit connecting respectively disconnecting them with respectively from the hydraulic cylinders with which they are associated.

19. A device according to claim 1, wherein the aforesaid height correctors are provided with isolation slide valves controlled by the pressure of the braking system and by the pressure of a hydraulic assisted steering device.

20. An automotive vehicle equipped with a device according to claim 1.

* * * * *

UNITED STATES PATENT AND TRADEMARK OFFICE
CERTIFICATE OF CORRECTION

PATENT NO. : 4,930,807

DATED : June 5, 1990

INVENTOR(S) : Lachaize

Page 1 of 2

It is certified that error appears in the above-identified patent and that said Letters Patent is hereby corrected as shown below:

The title page showing the illustrative figure should be deleted to appear as per attached title page.

Signed and Sealed this

Sixteenth Day of April, 1991

Attest:

*Attesting Officer*

HARRY F. MANBECK, JR.

*Commissioner of Patents and Trademarks*

United States Patent [19]

Lachaize

[11] Patent Number: 4,930,807
[45] Date of Patent: Jun. 5, 1990

[54] SEMI-ACTIVE HYDROPNEUMATIC SUSPENSION DEVICE AND AUTOMOTIVE VEHICLE EQUIPPED WITH THIS DEVICE

[75] Inventor: Henri Lachaize, Fontenay-Aux-Roses, France

[73] Assignees: Automobiles Peugeot, Paris; Automobiles Citroen, Neuilly Sur Seine, both of France

[21] Appl. No.: 292,435

[22] Filed: Dec. 30, 1988

[30] Foreign Application Priority Data

Jan. 12, 1988 [FR] France .................. 88 00276

[51] Int. Cl.$^5$ .................. B60G 21/00; B60G 11/04
[52] U.S. Cl. .................. 280/707; 280/708
[58] Field of Search .................. 280/707, 688, 708

[56] References Cited

U.S. PATENT DOCUMENTS

| 3,356,954 | 5/1967 | Gottschalk | 280/6 |
|---|---|---|---|
| 4,773,671 | 9/1988 | Inagaki | 280/707 |
| 4,796,911 | 1/1989 | Kuroki et al. | 280/707 |

FOREIGN PATENT DOCUMENTS

| 0035330 | 9/1981 | European Pat. Off. |
| 1580316 | 3/1960 | Fed. Rep. of Germany |
| 67446 | 3/1958 | France |
| 68500 | 4/1958 | France |
| 1256864 | 2/1961 | France |
| 1535641 | 7/1968 | France |
| 7006442 | 10/1971 | France |
| 7337276 | 6/1974 | France |
| 1488254 | 10/1977 | United Kingdom |

OTHER PUBLICATIONS

"Automotive Products", Nov. 23, 1983.
French Patent Office Search Report, 10/88.
Design Engineering, "Fluid Power its Place in Car Design", pp. 59–65, (May, 1979).

Primary Examiner—Richard A. Bertsch
Attorney, Agent, or Firm—Kenyon & Kenyon

[57] ABSTRACT

The present invention relates to a semi-active hydropneumatic suspension device which comprises a hydraulic cylinder associated with each of the wheels, provided with a main chamber connected through the medium of a damper with a main hydropneumatic accumulator, each hydraulic cylinder of the front axle being equipped with a height corrector, whereas the rear axle is equipped with a height corrector controlling at least one of the hydraulic cylinders of this axle, wherein each of the hydraulic cylinders is provided with an annular chamber hydraulically connected with at least one hydropneumatic accumulator of the suspension, whereas the height corrector of the rear axle is fed by an additional hydropneumatic compensating accumulator.

20 Claims, 9 Drawing Sheets